United States Patent
Koenig

[11] Patent Number: 5,884,531
[45] Date of Patent: Mar. 23, 1999

[54] LOW LASH ROTATING CONDUIT END FITTING FOR A REMOTE CONTROL CABLE ASSEMBLY THAT ISOLATES AGAINST VIBRATION/NOISE TRANSMISSION

[75] Inventor: Peter C. Koenig, Moberly, Mo.

[73] Assignee: Dura Automotive Systems, Inc., Rochester Hills, Mich.

[21] Appl. No.: 757,771

[22] Filed: Nov. 27, 1996

[51] Int. Cl.[6] .................................................. F16C 1/10
[52] U.S. Cl. .................. 74/502.4; 74/502.6; 74/500.5; 74/501.5 R
[58] Field of Search ............... 74/502, 501.5 R, 74/500.5, 502.4, 502.6

[56] References Cited

U.S. PATENT DOCUMENTS

| | | | |
|---|---|---|---|
| 4,333,361 | 6/1982 | Spease | 74/501 |
| 4,348,348 | 9/1982 | Bennett et al. | 264/255 |
| 4,386,755 | 6/1983 | Bennett et al. | 249/83 |
| 4,406,177 | 9/1983 | Bennett et al. | 74/501 |
| 4,726,251 | 2/1988 | Niskanen | 74/502 |
| 4,763,541 | 8/1988 | Spease | 74/502.4 |
| 4,793,050 | 12/1988 | Niskanen | 29/455 |
| 4,860,609 | 8/1989 | Spease | 74/502 |
| 4,951,524 | 8/1990 | Niskanen | 74/502 |
| 5,003,838 | 4/1991 | Pospisil et al. | 74/502 |
| 5,144,856 | 9/1992 | Roca | 74/501.5 R |
| 5,161,428 | 11/1992 | Petruccello | 74/502 |
| 5,383,377 | 1/1995 | Boike | 74/502 |
| 5,448,926 | 9/1995 | Reasoner | 74/500.5 |

FOREIGN PATENT DOCUMENTS

| | | | |
|---|---|---|---|
| 0183341 | 6/1986 | European Pat. Off. | 74/502.4 |
| 2644532 | 9/1990 | France | 74/502.6 |
| 93 06 761.5 | 7/1993 | Germany | F16C 1/14 |
| 362067 | 8/1938 | Italy | 74/502.4 |
| 978314 | 12/1964 | United Kingdom | 74/502.4 |
| 2040383 | 8/1980 | United Kingdom | 74/502.4 |
| 2151758 | 7/1985 | United Kingdom | 74/502.4 |

OTHER PUBLICATIONS

Patent Abstracts of Japan, vol. 095, No. 011, Dec. 26, 1995 & JP 07 208443 A (Toyoda Gosei Co Ltd), Aug. 11, 1995.

*Primary Examiner*—Vinh T. Luong
*Attorney, Agent, or Firm*—Michael D. Bednarek; Kilpatrick Stockton LLP

[57] ABSTRACT

An end fitting for use in a remote control cable assembly of the type having a control cable that includes a conduit and a wire-like strand or core element. The end of the strand is typically attached to a slider rod that extends within a swivel tube. The swivel tube is supported within a swivel socket provided in the end fitting. The end fitting allows for easy rotation of the end fitting relative to the axis of the conduit and provides for isolation against noise and vibration transmission, while not adding additional lash into the cable system from the rotating end fitting joint. The end fitting has four pieces, a molded sleeve, conduit isolator, outer fitting (side entry fitting) and end cap. The conduit isolator, end cap, molded outer fitting and molded sleeve, are toleranced such that when they are assembled, they have a slight interference and thus reduce the lash generated by the rotational joint. The conduit isolator further is manufactured from a resilient material that isolates against transmission of vibration/noise and can be easily compressed by a snap fitting operation.

15 Claims, 2 Drawing Sheets

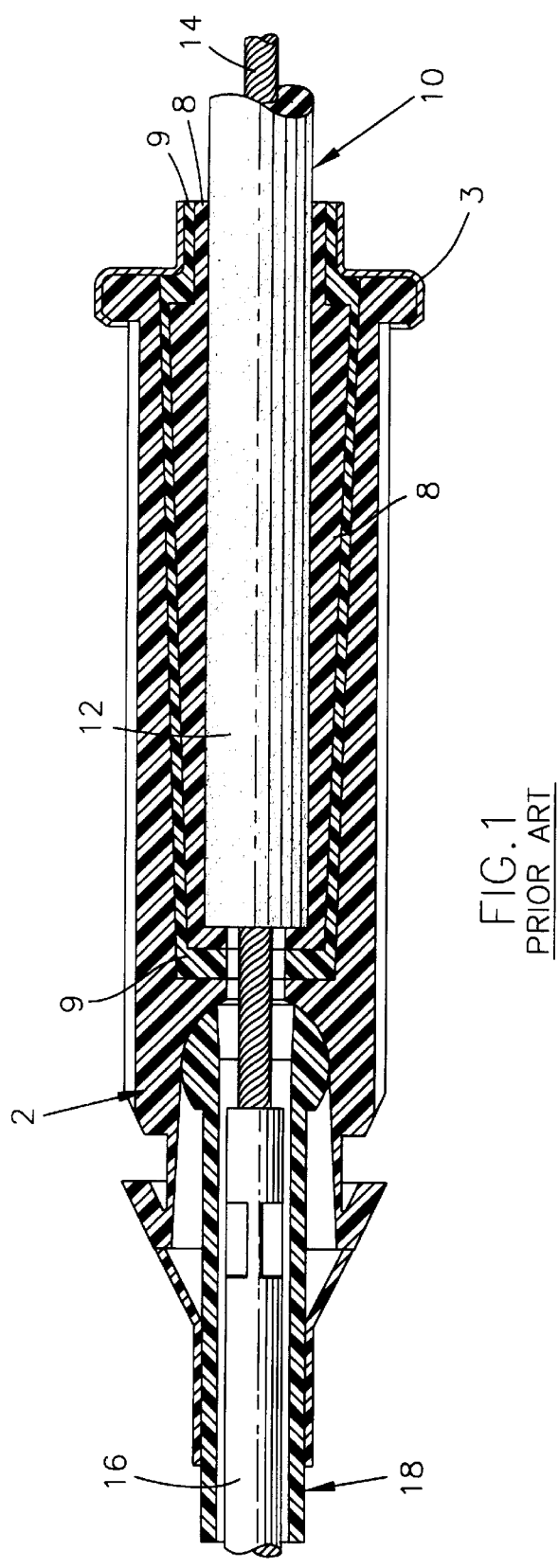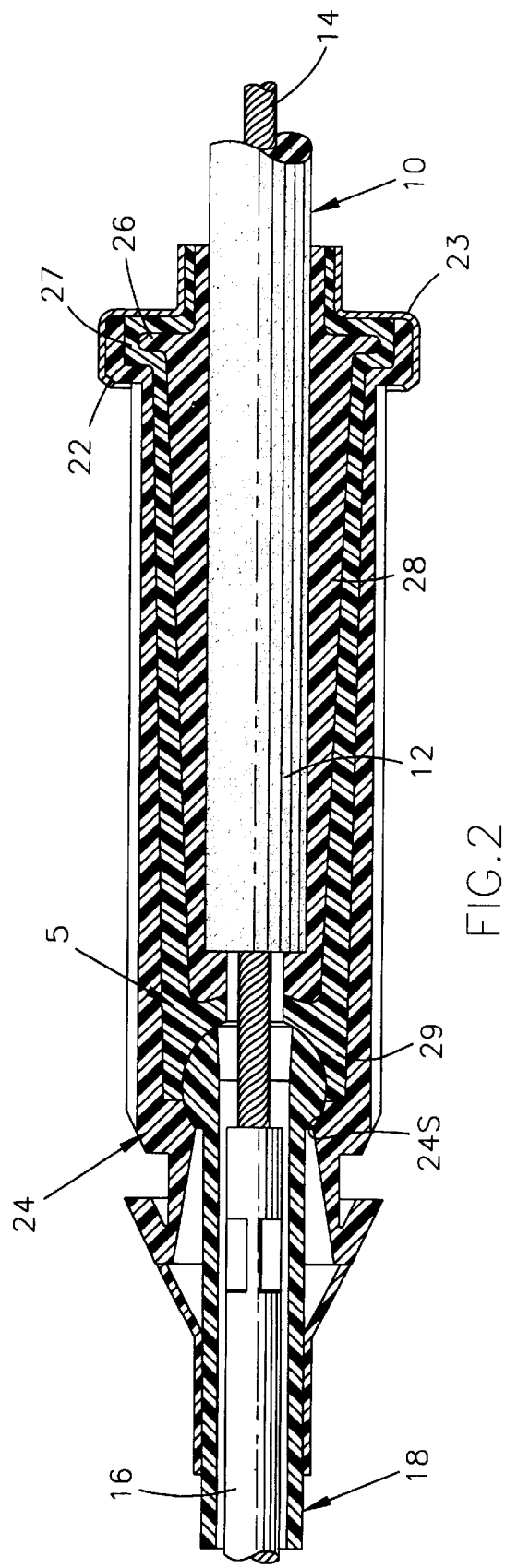

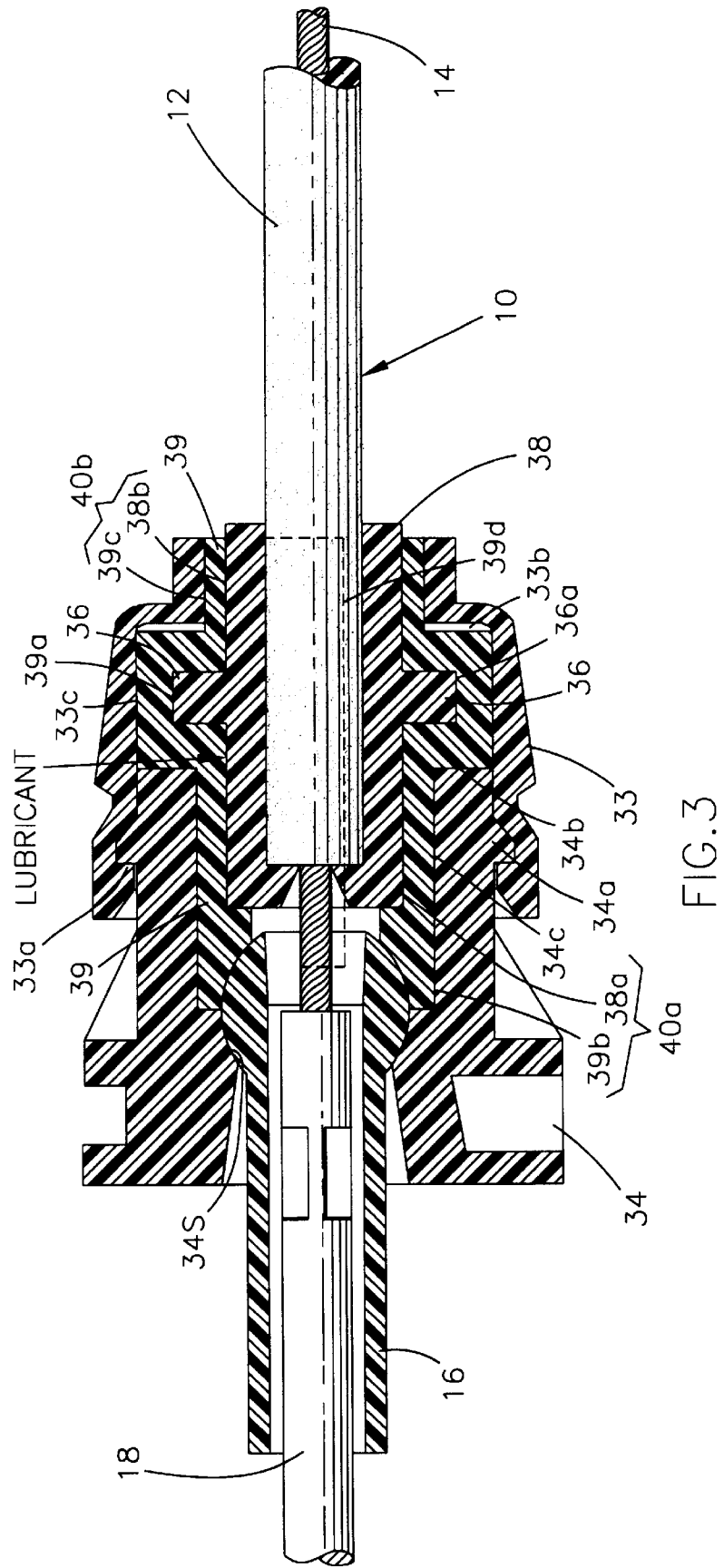

LOW LASH ROTATING CONDUIT END FITTING FOR A REMOTE CONTROL CABLE ASSEMBLY THAT ISOLATES AGAINST VIBRATION/NOISE TRANSMISSION

BACKGROUND

1. Field of the Invention

The present invention relates to a conduit end fitting for a motion transmitting remote control cable assembly of the type used in transmission shift cables, park brake cables and light duty control cables and a method for making such a fitting.

2. Background Art

Motion transmitting remote control cable assemblies are used for transmitting both force and travel along a curved path in aircraft, automotive, and marine environments. Known cable assemblies can be used for transmitting load and motion in both push and pull type applications. In the automotive environment, typical applications include but are not limited to parking brake, accelerator, hood release, brake release, trunk release, park lock, tilt wheel control, fuel filler door, transmission shifter cables and hydraulic control cables. One specific use of such remote control assemblies is the positioning of throttle and transmission shift members in automobiles.

Motion transmitting remote control assemblies for transmitting motion in a curved path typically include flexible core element (strand) slidably enclosed within a flexible outer sheath (conduit) with end fittings attached to both ends of each respective member. These fittings attach to and react load from the conduit to its mounting points and from the strand to its mounting points respectively. The core element is adapted at one end to be attached to a member to be controlled whereas the other end is attached to a manual actuator for longitudinally moving the core element. Thus, in the automotive environment, for example, assemblies normally include one or more fittings secured to the conduit for attaching the conduit to a support structure of the automobile.

The conduit end fittings must remain attached to the conduit while resisting relative axial movement (lash) between the conduit and the conduit end fittings. These conduit end fittings may be attached to the conduit in many ways, which can include: over molding, gluing, press fitting, screw on, spin welding, staking as well as many other methods. Although all these methods provide for a strong joint that resists axial movement, unfortunately, they all eliminate relative rotational movement between the conduit and the conduit end fittings.

Having the conduit end fittings fixed against rotation relative to the conduit creates a problem in that, during the assembly operation, the operator frequently has to twist the conduit end fitting along the axis of the conduit in order to line it up and install it in the mounting point. When the conduit end fitting is fixed against rotation relative to the conduit, this twisting operation has the detrimental effect of, among other things, slowing down the assembly process and twisting and binding the conduit. To eliminate the assembly problems, it is desirable to have conduit end fittings on the conduit that provide for easy rotation about the axis of the conduit, and thus speed up the assembly time and reduce binding and twisting of the conduit.

One example of a known conduit end fitting product is shown in FIG. 1. As shown, the control cable 10 includes a conduit 12 and a wire-like strand or core element 14. The end of the strand 14 is attached to a slider rod 16 that extends within a swivel tube 18. The swivel tube 18 is supported within a swivel socket provided an the conduit end fitting. The conduit end fitting of this prior art design includes a hard plastic sleeve 8 molded onto an end of the conduit. A compressible isolator 9 is molded or pressed over the molded sleeve. The sleeve and isolator are tapered toward the end of the conduit and contained within molded outer fitting 2. A spherical cavity or socket 2s for receiving the swivel tube is formed entirely within the outer fitting 2 at the one of the conduit end fitting. The opposite end of the conduit end fitting, i.e., the end that receives the conduit, is capped with a cap, which is typically formed of metal. This design does not, however, include any means to facilitate rotation of the end fitting relative to the conduit.

In addition, because the spherical socket or cavity for receiving the swivel tube 18 is formed entirely within the outer fitting 2, the swivel tube must be snapped into the socket during assembly. As a consequence, the spherical extent of the socket is limited and the degree to which the swivel tube is securely retained within the socket is also limited.

It is known to make conduit end fittings that rotate about the axis of the conduit. Conduit end fittings that rotate about the axis of the conduit are shown, for example, in U.S. Pat. Nos.: 4,860,609; 4,951,524; 5,161,428 and 5,383,377.

U.S. Pat. No. 4,860,609 discloses a flexible motion transmitting core element that includes a conduit (12), a flexible motion transmitting core element (14) that is slidably supported by the conduit and a connector member (16) that includes an annular radially extending flange (18). The assembly (10) further includes an end fitting (30) having a cylindrical portion (32). The cylindrical portion (32) is positioned over the outer surface of the connector member (16) such that the cylindrical portion (32) abuts the flange (18). A retainer (38) simultaneously engages the end fitting (30) and the flange (18) for preventing relative axial movement between the conduit (12) and the end fitting (30) while permitting relative rotational movement therebetween.

U.S. Pat. No. 4,951,524 discloses a flexible motion transmitting core element (28) that includes a supporting fitting (14) having first and second ends defining a first axis for extending through a substantially U-shaped seat (18) in a support structure (20). A core element (28) is movably supported by the support fitting (14) for transmitting motion between the ends thereof. The assembly (10) includes a pair of spaced flanges (52, 52', 54, 54o) supported about the support fitting (14) for allowing relative rotation therebetween and positioning the support fitting (14) in the substantially U-shaped seat (18) on the support structure (20).

U.S. Pat. No. 5,161,428 discloses a motion transmitting remote control assembly (10) for transmitting forces along a curved path by a flexible core element (26) slidably disposed within a flexible conduit (12). The assembly (10) includes an elongated member (62) for adjusting the longitudinal position of the conduit (12) by being slidably disposed within a passageway (68) of a support member (32). A locking clip (86) is movable between a disengaged position for permitting relative longitudinal movement between the elongated member (62) and the base (32) and an engaged position for preventing longitudinal movement therebetween. The elongated member (62) is rotatably supported on the conduit (12) to allow rotation of the conduit (12) relative to the support member (32) while in an engaged position.

U.S. Pat. No. 5,383,377 discloses a flexible motion transmitting core element (54) that includes a conduit (12) and a cable (54) that is movably supported along its length within the conduit (12). A support member (48) attaches one end (14) of the conduit (12) to a support structure (46). An isolator (96) is disposed between the support member (48) and the conduit end (14). The conduit end (14) has an integral conduit end fitting (18). The isolator (96) dampens vibrations and shocks transmitted between the support member (48) and the conduit end (14). The isolator (96) is fixed against transnational movement relative to the conduit end (14). An anti-stick coating (106) disposed on the outer surface (100) of the conduit end fitting (18) allows the conduit end (14) and conduit end fitting (18) to rotate relative to the support member (48).

The assemblies described in these patents have various disadvantages. For example, the fittings may introduce extra lash into the cable assembly, which in turn reduces the travel efficiency of the push pull cable system. The fittings may also complicate assembly and increase capital and labor expense.

Another known assembly is described in U.S. Pat. No. 4,726,251, which discloses a flexible core element (12) in a conduit (18) and a method of making same. An end fitting (20) is disposed about the conduit (18) by a cylindrical section which includes abutments (24). A vibration dampener (16) includes a cylindrical tube disposed about the end fitting (20) with grooves (28) aligned with the abutments (24) and tabs (30) extending radially outward from the vibration dampener (16). A support (14) includes a cylindrical wall (32) disposed about and coextensive with the vibration dampener (16) with openings (34) aligned with the tabs (30) of the vibration dampener (16). The vibration dampening means (16) is in axial mechanical interlocking engagement with the end fitting (20) and support (14) for maintaining the vibration dampener (16) free of radial compressive forces.

Likewise, U.S. Pat. No. 4,793,050 discloses a flexible core element (12) in a conduit (18) and a method of making same. An end fitting (20) is disposed about the conduit (18) by a cylindrical section which includes abutments (24). A vibration dampener (16) includes a cylindrical tube disposed about the end fitting (20) with grooves (28) aligned with the abutments (24) and tabs (30) extending radially outward from the vibration dampener (16). A support (14) includes a cylindrical wall (32) disposed about and coextensive with the vibration dampener (16) with openings (34) aligned with the tabs (30) of the vibration dampener (16). The vibration dampener (16) is in axial mechanical interlocking engagement with the end fitting (20) and support (14) for maintaining the vibration dampener (16) free of radial compressive forces.

U.S. Pat. No. 5,003,838 discloses a flexible motion transmitting core element assembly (10) that includes a conduit (16) with a male end fitting (20) molded at one end, which engages with a female end fitting (30). The female end fitting (30) includes a conduit (38) and attaches to a support structure (90). Splining (24, 32) is provided on the engaging portions of the male end fitting (20) and the female end fitting (30) to allow for precise rotational adjustment and locking between the male end fitting (20) and the female end fitting (30).

U.S. Pat. No. 4,406,177 and U.S. Pat. No. 4,348,348 disclose a flexible motion transmitting core element that includes a flexible motion transmitting core element and a flexible conduit. An end fitting is disposed about the end portion of the conduit for supporting the conduit and core element with the core element extending from the end fitting. The assembly also includes a support housing for supporting the end fitting and the conduit on a support structure. A resilient vibration dampener is disposed between the support housing and the end fitting for providing noise and vibration isolation therebetween. A mold assembly and a method are also disclosed for making the motion transmitting remote control assembly including the steps of; inserting the end portion of the conduit into a cavity of a first mold and injecting organic polymeric material into the cavity for molding the end fitting about the conduit, inserting the end fitting into a cavity of a second mold and injecting a vibration dampening material into the mold for molding a vibration dampener about the end fitting, and placing the vibration dampener into a cavity of a third mold and injecting an organic polymeric material for molding a support housing about the vibration dampener.

Similarly, U.S. Pat. No. 4,386,755 discloses a mold assembly and a method for making a motion transmitting remote control assembly including the steps of; inserting the end portion of the conduit into a cavity of a first mold and injecting organic polymeric material into the cavity for molding the end fitting about the conduit, inserting the end fitting into a cavity of a second mold and injecting a vibration dampening material into the mold for molding a vibration dampener about the end fitting, and placing the vibration dampener into a cavity of a third mold and injecting an organic polymeric material for molding a support housing about the vibration dampener.

Notwithstanding these prior art disclosures, there remains a need for an end fitting for a remote control cable assembly that allows for easy rotation of the end fittings relative to the axis of the conduit, provides for isolation against noise and vibration transmission, and does not add significant additional lash into the cable system from the rotating end fitting joint.

SUMMARY OF THE INVENTION

The present invention overcomes the disadvantages of the known systems described above by providing an end fitting for a remote control cable assembly that allows for easy rotation of the end fittings relative to the axis of the conduit and provides for isolation against noise and vibration transmission, while minimizing lash added into the cable system from the rotating end fitting joint. This is accomplished by a four piece conduit end fitting assembly that connects the conduit to its mounting point.

The first piece (molded sleeve) is fastened directly onto and along the longitudinal axis of the conduit and is characterized by having a first cylindrical shoulders feature for receiving and retaining the second piece, and a second cylindrical shoulder feature for guiding the rotational movement of the whole end fitting assembly along the axis of the conduit.

The second piece (conduit isolator) is characterized by being molded from a elastomeric material and being comprised of two pieces that are connected by a living hinge, but not limited to being connected this way. The second piece is further characterized by a cylindrical cavity for receiving the cylindrical shoulder of the molded sleeve and having a partial spherical cavity for receiving and supporting a swivel tube. The conduit isolator is assembled to the molded sleeve by folding the two halves about the living hinge and over the shoulder portions of the molded sleeve, but could be overmolded.

The third piece (molded outer fitting or side entry fitting) is characterized by having features molded into its outside periphery that mate with and snap into a transmission and/or shifter mounting bracket. The side entry fitting is further characterized by having a partial spherical cavity for receiving and supporting a swivel tube, and having a cylindrical cavity for receiving the front cylindrical portion of the assembly created by folding the conduit isolator over the molded sleeve. The side entry fitting is also characterized by having a outside lip that mates with the fourth piece and forms a annular snap fit. It should be understood, however, that the outer surface of the end fitting 24 could take any form that is suitable for mounting in a fitting and need not be limited to a side entry fitting.

The fourth piece (end cap) is characterized by having a cylindrical cavity for receiving the rear cylindrical portion of the assembly created by folding the conduit isolator over the molded sleeve. The end cap is further characterized by having an internal lip the mates with the third piece and forms a annular snap fit. The side entry fitting and end cap are snapped together over top of the assembly created by folding the conduit isolator over the molded sleeve, which in turn compresses the conduit isolator up against both the front and back portions of the first shoulder of the molded sleeve. A small amount of lubricant is applied to the conduit isolator prior to assembly to facilitate the easy rotational movement of the conduit end fitting assembly relative to the axis of the conduit.

The conduit isolator, end cap, side entry fitting and molded sleeve, are toleranced such that when they are assembled, they have a slight interference and thus reduce the lash generated by the rotational joint. The conduit isolator further is manufactured from a resilient material that isolates against transmission of vibration/noise and can be easily compressed by the snap fitting operation.

BRIEF DESCRIPTION OF THE DRAWINGS

FIG. 1 is a cross sectional view of a prior art end fitting design;

FIG. 2 is a cross sectional view of a first embodiment of an end fitting according to the present invention;

FIG. 3 is a cross section of another embodiment of an end fitting according to the present invention.

DETAILED DESCRIPTION

The present invention is an end fitting that is particularly well suited for use in a remote control cable assembly of the type having a control cable 10 that includes a conduit 12 and a wire-like strand or core element 14. The end of the strand 14 is typically attached to a slider rod 16 that extends within a swivel tube 18. The swivel tube 18 is supported within a swivel socket provided in the end fitting.

Each of the end fittings described hereinafter allow for easy rotation of the end fittings relative to the axis of the conduit and provide for isolation against noise and vibration transmission, while not adding additional lash into the cable system from the rotating end fitting joint. In each instance, this is accomplished by a four piece conduit end fitting assembly that connects the conduit to its mounting point. While the four pieces can take different forms, they may be generally referred to as a molded sleeve, conduit isolator, outer fitting (side entry fitting and end cap).

FIG. 2 shows a first embodiment according to the present invention. The control cable 10 includes a conduit 12 and a wire-like strand or core element 14. The end of the strand 14 is attached to a slider rod 16 that extends within a swivel tube 18. The swivel tube 18 is supported within a swivel socket provided in the end fitting.

The end fitting of this embodiment is similar in many respects to the prior art design shown in FIG. 1, but there are significant differences. The end fitting includes a hard plastic sleeve 28 molded onto an end of the conduit 12. The molded sleeve is fastened directly onto and along the longitudinal axis of the conduit and is characterized by having a first cylindrical shoulder feature (provided by radial flange 26) for receiving and retaining a compressible isolator 29 and a second cylindrical shoulder feature for guiding the rotational movement of the whole end fitting assembly along the axis of the conduit.

The compressible isolator 29 is preferably molded from a elastomeric material as two pieces that are connected by a living hinge, but not limited to being connected this way. Instead the isolator could be molded over the molded sleeve. The sleeve and isolator are tapered toward the end of the conduit and located within a molded outer fitting 24. The taper facilitates assembly of the sleeve and isolator into the molded outer fitting, while reducing lash by providing a radial reaction component to axial forces and facilitates compression of the isolator for the same reason.

The isolator 29 is preferably formed of a compressible elastic (resilient) elastomeric material. This is to be contrasted with the molded sleeve 28 and the outer fitting 24 both of which are formed of a hard, noncompressible plastic material. The specific materials used are not critical, but the isolator must be significantly more compressible that the molded sleeve and outer fitting. The isolator 29 is preferably a compressible material such as urethane or TPO (santoprene). The molded sleeve is preferably formed of nylon (32% mineral filled nylon 66) and the outer fitting is preferably formed of the same material.

The isolator 29 includes a cylindrical cavity 39a for receiving the cylindrical shoulder of the molded sleeve and has a partial spherical cavity or socket 24s for receiving and supporting the swivel tube 18 at one end of the conduit fitting. The conduit isolator is preferably assembled to the molded sleeve by folding the two halves about the living hinge over the shoulder portions of the molded sleeve, but the conduit isolator could also be overmolded. The molded outer fitting 24 includes features molded into its outside periphery that allow the outer fitting to be secured to a transmission and/or shifter mounting bracket, any suitable outer periphery shape could be used. The molded outer fitting is further characterized by having a partial spherical cavity for receiving and supporting a swivel tube, and having a cylindrical cavity for receiving the front cylindrical portion of the assembly created by folding the conduit isolator over the molded sleeve. The molded outer also includes a radial flange that mates with end cap 23.

The opposite end of the conduit end fitting, i.e., the end that receives the conduit, is capped with the end cap 23, which, in this embodiment, is typically formed of metal. The end cap 23 has a cylindrical cavity for receiving the rear cylindrical portion of the outer fitting 24. The end cap can thus be bent around the outer fitting as shown or otherwise connected to cap the assembly created by folding the conduit isolator over the molded sleeve.

The conduit isolator, end cap, side entry fitting and molded sleeve, are dimensioned such that when they are assembled, they have a slight interference. Because of this interference, the capping action compresses the conduit isolator up against both the front and back portions of the first shoulder of the molded sleeve thus reducing the lash generated by the rotational joint. A small amount of lubricant is applied to the conduit isolator prior to assembly to facilitate the easy rotational movement of the conduit end fitting assembly relative to the axis of the conduit. This avoids the need for a circumferential anti-stick surface provided contiguous with the isolator or an anti-stick coating on the outer surface of the molded sleeve. Again, the conduit isolator is manufactured from a compressible resilient material that isolates against transmission of vibration/noise and can be easily compressed by the snap fitting operation.

As noted above, there are several significant differences between the end fitting of this embodiment and the prior art design shown in FIG. 1. To begin with, a radially outwardly extending flange 26 is formed on the sleeve 28 proximate one end thereof. To accommodate the flange, the outer fitting 24 includes an annular collar 22 with an internal lip that extends radially inward of the outer edge of the flange 26. The provision of the flange 26 and collar 22 allows the flange 26 of the sleeve 28 to be sandwiched and thus secured against lash in both directions. Specifically, the flange is sandwiched between the end cap 23 in one direction and the internal lip of the outer fitting in the other direction. As a result, the only lash possible is due to compression of the isolator. Consequently, this design reduces lash to a very low level, while also providing noise and vibration isolation.

In addition, the partial spherical socket or cavity 24s for receiving the swivel tube 18 is formed by partial spherical portions of two distinct components, the outer fitting 24 and the isolator 29. This makes it possible to insert the swivel tube through the back side of the outer fitting 24 (before the isolator and sleeve are inserted therein) rather than snapping the swivel tube into the socket. As a consequence, the spherical extent of the socket can be greater than otherwise possible to ensure that the swivel tube is securely retained within the socket.

FIG. 3 shows a second embodiment according to the present invention. Again, the control cable 10 includes a conduit 12 and a wire-like strand or core element 14. The end of the strand 14 is attached to a slider rod 16 that extends within a swivel tube 18. The swivel tube 18 is supported within a swivel socket provided in the end fitting.

The end fitting of this embodiment includes a hard plastic sleeve 38 molded onto an end of the conduit 12. The molded sleeve is fastened directly onto and along the longitudinal axis of the conduit and is characterized by having a first cylindrical shoulder feature (provided by radial flange 36) for receiving and retaining a compressible isolator 39 and a second cylindrical shoulder feature for guiding the rotational movement of the whole end fitting assembly along the axis of the conduit.

The compressible isolator 39 is formed of a compressible elastic (resilient) elastomeric material. This is to be contrasted with the molded sleeve 38 and the outer fitting 34, both of which are formed of a hard, noncompressible plastic material. The specific materials used are not critical, but the isolator must be significantly more compressible that the molded sleeve and outer fitting. The isolator 39 is preferably a compressible material such as urethane or TPO (santoprene). The molded sleeve 38 is preferably formed of nylon (32% mineral filled nylon 66) and the outer fitting 34 and end cap 33 are preferably formed of the same material.

The isolator 39 includes a cylindrical cavity 39a for receiving the cylindrical shoulder 36 of the molded sleeve having an outer periphery 36a and has a partial spherical cavity or socket 34s for receiving and supporting the swivel tube 18 at the one of the conduit end fitting. The conduit isolator is preferably assembled onto the molded sleeve by folding the two halves about the living hinge 39d and over the shoulder portions of the molded sleeve, but could be molded over the molded sleeve.

Though it is not shown, the sleeve and isolator could be tapered toward the end of the conduit as in the previous embodiment. Again, such a taper facilitates assembly of the sleeve and isolator into the molded outer fitting 34, reduces lash by providing a radial reaction component to axial forces and facilitates compression of the isolator for the same reason.

The molded outer fitting 34 (here a side entry fitting) is characterized by having features molded into its outside periphery that mate with and snap into a transmission and/or shifter mounting bracket. The molded outer fitting 34 is further characterized by having a partial spherical cavity 34s for receiving and supporting the swivel tube 18 and having a cylindrical cavity 34c for receiving the front cylindrical portion 40a, comprising the front portion 39b of the isolator 39 and front portion 38a of the molded sleeve 38, of the assembly, comprising the isolator 39 and the molded sleeve 38, created by folding the conduit isolator over the molded sleeve. The molded outer fitting 34 also includes an outside lip 34a that mates with an end cap 33 and forms a annular snap fit.

The end cap 33 is formed of hard plastic and includes a cylindrical cavity 33c for receiving the rear cylindrical portion 40b, comprising the rear portion 39c of the isolator 39 and rear portion 38b of the molded sleeve 38, of the assembly 40, comprising the isolator 39 and the molded sleeve 38, created by folding the conduit isolator over the molded sleeve 38. The end cap 33 also includes an internal lip 33a that mates with the outer fitting 34 to provide the aforementioned snap fit. In particular, the outer fitting 34 and end cap 33 are snapped together over the top of the assembly created by folding the conduit isolator over the molded sleeve to cap the assembly.

The conduit isolator, end cap, side outer fitting and molded sleeve, are dimensioned such that when they are assembled, they have a slight interference. Because of this interference, the capping action compresses the conduit isolator up against both the front and back portions of the first shoulder of the molded sleeve thus reducing the lash generated by the rotational joint. A small amount of lubricant is applied to the conduit isolator prior to assembly to facilitate the easy rotational movement of the conduit end fitting assembly relative to the axis of the conduit. This obviates the need for a circumferential anti-stick surface provided contiguous with the isolator or an anti-stick coating on the outer surface of the molded sleeve. Again, the conduit isolator is manufactured from a compressible resilient material that isolates against transmission of vibration/noise and can be easily compressed by the snap fitting operation.

Again, there are several significant differences between the end fitting of this embodiment and the prior art design shown in FIG. 1. To begin with, the radially outwardly extending flange 36 is formed on the sleeve 38 proximate one end thereof. To accommodate the flange, both the outer fitting 34 and the end cap 33 include annular end surfaces that extend radially inward of the outer edge of the flange 36. The provision of the flange 36 and collar 32 allows the sleeve 38 to be sandwiched and thus secured against lash in both directions. Specifically, the flange is sandwiched between the end cap 33 in one direction and the outer fitting 34 in the other direction. As a result, the only lash possible is due to compression of the isolator. Consequently, this design reduces lash to a very low level, while also providing noise and vibration isolation.

The embodiment of FIG. 3 also includes a snap fit between the outer fitting and the end cap to ease assembly. In addition, the partial spherical socket or cavity 34s for receiving the swivel tube 18 is formed by two distinct components, the outer fitting and the isolator. This makes it possible to insert the swivel tube through the back side of the outer fitting rather than snapping the swivel tube into the socket. As a consequence, the spherical extent of the socket can be greater than otherwise possible to ensure that the swivel tube is securely retained within the socket.

It will be appreciated that the present invention provides several significant advantages over prior art adjusters. In general, these advantages may be characterized as significantly reduced lash, greater simplicity and improved reliability.

While in accordance with the Patent Statutes, the preferred forms and embodiments of the invention have been illustrated and described, it will be apparent to those skilled in the art that other changes and modifications may be made without deviating from the inventive concepts set forth above.

I claim:

1. A conduit end fitting for a remote control cable assembly that allows for easy rotation of the fitting relative to a conduit having a longitudinal axis, comprising:
   a molded sleeve fastened directly onto and along the longitudinal axis of the conduit, the molded sleeve including a radially outwardly extending flange;
   a conduit isolator formed of a compressible elastomeric material, the conduit isolator further comprising a cavity for receiving the radially outwardly extending flange of the molded sleeve and having a partial spherical seat portion, the conduit isolator surrounding an assembly that has a front portion and a rear portion;
   a molded outer fitting having an outside periphery, the molded outer fitting further comprising a spherical seat portion for receiving and supporting a swivel tube, and having a cylindrical cavity for receiving a front portion of the assembly created by the conduit isolator and the molded sleeve, the molded outer fitting also including an outside lip;
   an end cap having a cylindrical cavity for receiving the rear portion of the assembly created by the conduit isolator and the molded sleeve, the end cap comprising an internal lip the mates with the outside lip of the molded outer fitting so as to cap the assembly.

2. The conduit end fitting of claim 1, wherein the conduit isolator comprises two pieces that are connected by a living hinge.

3. The conduit end fitting of claim 2, wherein the conduit isolator is assembled to the molded sleeve by folding the two halves about the living hinge and over the flange of the molded sleeve.

4. The conduit end fitting of claim 1, wherein the conduit isolator is molded onto the molded sleeve.

5. The conduit end fitting of claim 1, wherein the outside lip of the molded outer fitting forms a annular snap fit with the internal lip of the end cap, so that when the molded outer fitting and end cap are snapped together over top of the assembly created by folding the conduit isolator over the molded sleeve, the conduit isolator is compressed against both the front and back portions of the flange of the molded sleeve.

6. The conduit end fitting of claim 1, wherein a small amount of lubricant is applied to the conduit isolator prior to assembly to facilitate the easy rotational movement of the conduit end fitting assembly relative to the axis of the conduit.

7. The conduit end fitting of claim 1, wherein the conduit isolator, end cap, molded outer fitting and molded sleeve, are toleranced such that when they are assembled, they have an interference and thus reduce the lash generated by the rotational joint.

8. The conduit end fitting of claim 1, wherein the conduit isolator further is manufactured from a resilient material that isolates against transmission of vibration/noise and can be easily compressed by the snap fitting operation.

9. The conduit end fitting of claim 1, wherein the partial spherical seat portion further comprises a partial spherical socket or cavity formed by two distinct portions of the outer fitting and the isolator.

10. A motion transmitting remote control assembly of the type for transmitting motion along a curved path, said assembly comprising:
   a conduit having an end and a longitudinal axis;
   a flexible motion transmitting core element having a length and a central axis and movably supported along said length within said conduit;
   a molded sleeve fastened directly onto and along the longitudinal axis of the conduit such that the molded sleeve is fixed against longitudinal movement relative said conduit end, the molded sleeve including a radially extending flange, the flange having an outer edge;
   a molded outer fitting rotatably disposed about said molded sleeve for attaching said conduit end to a support structure;
   an isolator disposed between said molded outer fitting and said molded sleeve for dampening vibrations and shocks transmitted between the support structure and the conduit end;
   an end cap secured to the molded outer fitting; the outer fitting and the end cap each having annular end surfaces that extend radially inward beyond the outer edge of the flange, the end surfaces of the outer fitting and the end cap being located on opposite sides of the flange such that the flange is sandwiched via the conduit isolator between the end cap in one direction and the outer fitting in the other direction.

11. The motion transmitting remote control assembly of claim 10, wherein the isolator includes a portion surrounding the outer periphery of the radially extending flange, and wherein the end surfaces of the outer fitting and the end cap that are located on opposite sides of the flange compress the portion of the isolator against the sides of the flange so that the flange is sandwiched via the conduit isolator between the end cap in one direction and the outer fitting in the other direction.

12. The motion transmitting remote control assembly of claim 10, wherein the isolator is fixed against longitudinal movement relative to molded sleeve.

13. The motion transmitting remote control assembly of claim 10, wherein the isolator is formed of an elastomeric polymeric material.

14. The motion transmitting remote control assembly of claim 10, wherein the conduit isolator comprises two pieces that are connected by a living hinge.

15. The motion transmitting remote control assembly of claim 14, wherein the conduit isolator is assembled to the molded sleeve by folding the two halves about the living hinge and over the shoulder portions of the molded sleeve.

* * * * *